United States Patent
Bruns et al.

(10) Patent No.: US 10,214,617 B1
(45) Date of Patent: Feb. 26, 2019

(54) DISSOLVING TIRE RUBBER

(71) Applicant: ASPHALT SCIENCES, LLC., Reno, NV (US)

(72) Inventors: Joseph Randall Bruns, Scurry, TX (US); Hashem Hashemi, Irving, TX (US)

(73) Assignee: ASPHALT SCIENCES, LLC., Reno, NV (US)

( * ) Notice: Subject to any disclaimer, the term of this patent is extended or adjusted under 35 U.S.C. 154(b) by 14 days.

(21) Appl. No.: 15/283,821

(22) Filed: Oct. 3, 2016

Related U.S. Application Data

(60) Provisional application No. 62/236,861, filed on Oct. 3, 2015.

(51) Int. Cl.
    *C08J 3/20* (2006.01)

(52) U.S. Cl.
    CPC ........... *C08J 3/203* (2013.01); *C08J 2321/00* (2013.01)

(58) Field of Classification Search
    CPC ................................ C08L 7/00; C08L 2555/28
    See application file for complete search history.

(56) References Cited

U.S. PATENT DOCUMENTS

| | | | | |
|---|---|---|---|---|
| 4,068,023 A | * | 1/1978 | Nielsen | C08L 95/00 106/280 |
| 5,492,561 A | * | 2/1996 | Flanigan | C08L 19/003 106/273.1 |

FOREIGN PATENT DOCUMENTS

KR    1239399    *  3/2013   .............  C04B 26/26

* cited by examiner

*Primary Examiner* — Ling Siu Choi
*Assistant Examiner* — Thuy-Ai N Nguyen
(74) *Attorney, Agent, or Firm* — Kerr IP Group, LLC

(57) ABSTRACT

A method for generating a dissolving rubber compound in asphalt is described. The method includes receiving an asphalt compound and heating the asphalt compound to approximately 320° F. to 420° F. The method then proceeds to add a tire rubber compound to the asphalt compound. The asphalt compound and the tire rubber compound are mixed for approximately 5 minutes to 240 minutes. The dissolved rubber compound is generated by heating a mixture of the asphalt compound and the tire rubber to approximately 525° F.-700° F. The dissolved rubber compound is then cooled.

16 Claims, 2 Drawing Sheets

DISSOLVING TIRE RUBBER

CROSS-REFERENCE

This patent application claims the benefit of Provisional Patent Application 62/236,861 entitled, "Dissolving Tire Rubber" filed on Oct. 3, 2015, which is hereby incorporated by reference.

FIELD

This invention relates to a composition, system and method for dissolving tire rubber in asphalt or oils. More specifically, the invention relates to a composition, systems and methods for dissolving tire rubber in asphalt or oil by heating the mixture.

BACKGROUND

Each year the U.S. generates approximately 290 million scrap tires. About 12 million scrap tires are converted into ground tire rubber for modifying asphalt cements. The utilization of scrap tire rubber in asphalt started in the mid-1960's when ground tire rubber was placed in asphalt surface treatments, such as chip seal applications.

In terms of environmental concerns, the disposal of scrap tires is a major waste management issue. While these environmental concerns are important, there are various challenges associated with using ground tire rubber.

For example, with respect to hot applied chip seal, the inconsistent dissolution of ground tire rubber in asphalt can result in blockages to hot asphalt spray systems that apply the ground tire rubber/asphalt mixture. With respect to asphalt emulsions, the inconsistent dissolution of ground tire rubber in asphalt can interfere with the emulsification of asphalt in water due to the interference of the discrete rubber particles in the asphalt water inversion process. With respect to asphalt cutback, inconsistent dissolution of ground tire rubber in asphalt can result in blockages in cold asphalt spray systems used to apply the GTR solvent cut back asphalt to the road surface when used a gravel chip seal. With respect to tack coats, inconsistent dissolution of ground tire rubber in asphalt can interfere with even distribution and blockages in the spray applicator that may ultimately result in inferior pavement systems due to improper layers adhesion. With respect to pavement membranes, inconsistent dissolution of ground tire rubber in asphalt can interfere with even distribution and blockages in the spray applicator that may ultimately result in inferior pavement systems due to improper adhesion between the reinforcements and the pavement layers. With respect to pavement joint and caulking fillers, inconsistent dissolution of ground tire rubber in asphalt used in caulking formulations can interfere with even distribution and blockages in various applicators that may ultimately result in inferior sealing for pavement joints shortened road longevity. With respect to driveway sealers, inconsistent dissolution of ground tire rubber in asphalt used in driveway seal formulations can interfere with even distribution and sealing of the drive surface resulting in reduced protection.

The process of combining rubber with asphalt is described in various patents and patent publications.

For example, in U.S. Pat. No. 5,342,866, Trumbore teaches an elastomeric-asphalt composition which does not phase separate and which is compatible at high temperatures. In a preferred embodiment, the elastomeric materials are SBS and SIS block copolymers. Producing the asphalt composition includes preheating the asphalt to a temperature of at least about 350° F. Additionally, Trumbore teaches heating the mixture to a temperature of from about 400° to about 475° F. while maintaining the pressure in the converter under about 2 psig.

Nielsen in U.S. Pat. No. 4,068,023 teaches one of the earliest examples showing the incorporation of reclaimed rubber into asphalt for paving using elevated temperatures up to 450° F. with an admixture of aromatic oils.

In European Patent Application EP1877493 A2, Martin teaches a modified asphalt binder composition that includes about 40% by weight to about 98.9% by weight asphalt binder material, about 0.5% by weight to about 25% by weight crumb rubber, about 0.5% by weight to about 30% by weight of at least one synthetic polymer, and about 0.05% by weight to about 5% by weight of at least one acid. Martin also teaches a method for making a modified asphalt binder composition that includes providing neat asphalt, heating the neat asphalt to a temperature of between about 120° C. (248° F.) and about 200° C. (392° F.), adding a first modifying ingredient to the neat asphalt, mixing the asphalt and the first modifying ingredient with one of a high shear mixer or a low shear mixer for a period of between about 5 minutes and about 10 hours, adding a second modifying ingredient to the modified asphalt binder, mixing the second modifying ingredient and the modified asphalt binder in one of a high shear mixer or a low shear mixer for a period of between about 5 minutes and about 10 hours, adding a third modifying ingredient to the modified binder material, and agitating the third modifying ingredient and the modified binder material in one of a low shear mixer or a high shear mixer for a period of between about 5 minutes and about 48 hours.

In U.S. Pat. No. 5,492,561 Flanigan teaches incorporating the whole tire rubber into the asphalt medium by simulating a "boiling action" in the asphalt medium which allows the tire rubber to be absorbed into the asphalt medium at about 500° F. Flanigan states that below 485° F.-490° F. provides insufficient blending, while above 510° F. the temperature is too close to the flash point of the liquid. According to Flanigan, a temperature of about 500° F. is the safest temperature to use that is high enough to provide full incorporation of whole tire rubber granules into the asphalt medium but not so high that the process becomes unsafe. The Flannigan process produces a dissolved ground tire rubber after extended blending of 5-10 hours at 500° F., which degrades the asphalt blend by initiating an extended oxidation reaction that affects the quality of the asphalt.

SUMMARY

A method for generating a dissolving rubber compound in asphalt is described. The method includes receiving an asphalt compound and heating the asphalt compound to approximately 320° F. to 420° F. The method then proceeds to add a tire rubber compound to the asphalt compound. The asphalt compound and the tire rubber compound are mixed for approximately 5 minutes to 240 minutes. The dissolved rubber compound is generated by heating a mixture of the asphalt compound and the tire rubber to approximately 525° F.-700° F. The dissolved rubber compound is then cooled In one illustrative embodiment, the heated mixture is performed with minimal oxidation. The minimal oxidation may be performed by applying a non-oxidizing gas to the heated mixture. For example, a $N_2$ gas may be applied to the heated mixture.

In another illustrative embodiment, the mixture of the asphalt compound and the tire rubber is heated to approximately 575° F.-625° F. In yet another illustrative embodiment, the mixture of the asphalt compound and the tire rubber is heated to approximately 590° F.-610° F.

In yet another illustrative embodiment, the asphalt compound and the tire rubber compound are mixed for approximately 5 minutes to 60 minutes.

Another method for generating a dissolved rubber compound in oil is also described. The method includes receiving an oil compound and heating the oil compound to approximately 320° F. to 420° F. The method then proceeds to add a tire rubber compound to the oil compound. The oil compound and the tire rubber compound are mixed for approximately 5 minutes to 240 minutes. The dissolved rubber compound is generated by heating a mixture of the oil compound and the tire rubber to approximately 525° F.-700° F. The dissolved rubber compound is then cooled.

DRAWINGS

DESCRIPTION

Figure 1:
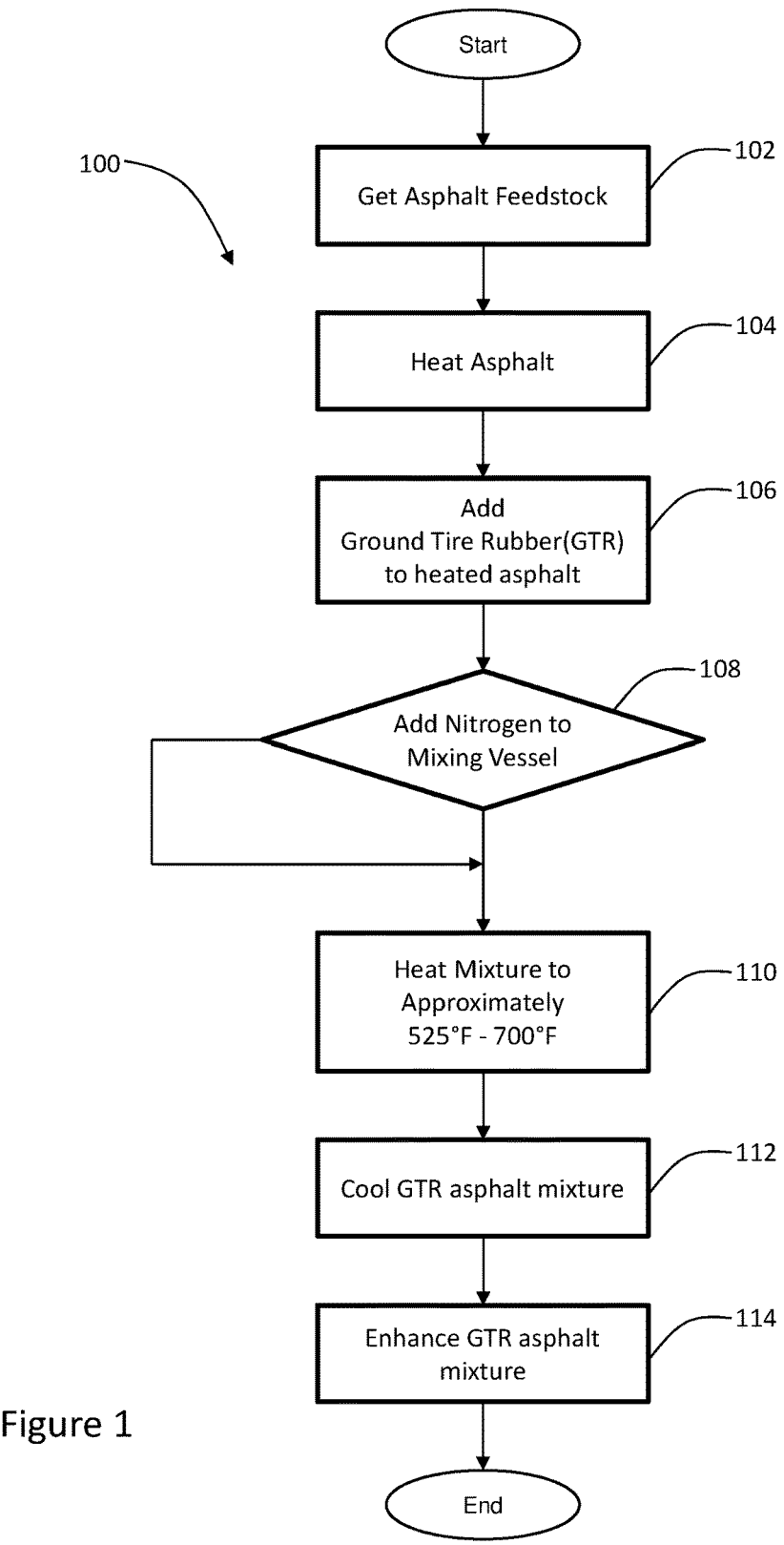
FIG. 1 shows an illustrative flow chart of a method for generating a coating such as an illustrative shingle roofing coating from relatively poor quality asphalt feedstocks.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the methods and compositions described hereinafter may vary as to configuration and as to details. Additionally, the methods may vary as to details, order of the actions, or other variations without departing from the illustrative methods disclosed here in.

Processes such as Flannigan (described above) teach heating to a temperature of 485° F. to 510° F. and requires high shear mixing for 5 to 10 hours to reduces the particle size of the rubber to have a solubility of better than 90%. However, the Flannigan process fails to improve the material performance because no significant increase in penetration at 77° F. is observed over the original bitumen. The inventors' hypothesize that the exposure of the vulcanized rubber at this lower temperature fail to completely release the process oils from ground tire rubber and, further, due to the extended exposure of the mixture to heat and oxygen the bitumen is degraded by oxidation and a reduction of the bitumen maltene fraction. Furthermore, the Flanigan process shows an increase in the carbonyls and sulfoxides that have been reported as indicators of accelerated aging. Thus, there are various limitations of Flannigan that are overcome by the systems, methods and compositions presented herein.

The systems, methods and compositions presented may be applied to asphalt road paving, hot applied chip seal, applied emulsions, asphalt cutback, tack boats, pavement membranes, pavement joint and caulking fillers and driveway fillers. The systems and methods presented herein overcome the challenges associated with undissolved ground tire rubber and inconsistently dissolved rubber.

With respect to hot applied chip seal, the systems, methods and compositions drastically reduces spray blockages during hot chip seal application. Additionally, the uniformity and consistent viscosity results in a more even asphalt application and improved adhesion of the gravel chip seal to the road surface.

With respect to asphalt emulsions, the systems, methods and compositions presented herein result in a high solubility of the ground tire rubber, which allows for a uniform dispersion of a consistent viscosity asphalt that is easily emulsified in anionic, cationic, and non-ionic emulsion technologies.

The systems, methods and compositions presented herein provide a better than 99% dissolution of ground tire rubber that drastically reduces spray blockages. Additionally, the systems, methods and compositions provide uniform and consistent viscosity results, which provides improved adhesion. Furthermore, the dark coloration from the carbon black results in a uniform black surface with improved weather capabilities. Further still, the oils released from the GTR improve the tack and adhesion properties of the asphalt resulting in a stronger bonding to surfaces, e.g. driveway surface.

The systems, methods and compositions presented herein may be applied to asphalt cutback, pavement membranes, tack coats, pavement joint and caulking fillers and driveway sealer. Asphalt tack coats (hot applied, solvent, and emulsion based) are used to improve the adhesion between layers of asphalt pavement.

The inventors' hypothesize that the systems and methods presented herein release the beneficial oils and carbon black from the vulcanized rubber, which enhances the maltene fraction of the asphalt. These released beneficial oils improve the pliability of the asphalt binder. The release of carbon black improves the weathering resistance because the asphalt can retain its dark color. Also, the release of the carbon black results in a deep black asphalt coloration that maintains a high contrast marking surface longer than conventional asphalt binders.

The systems and methods presented herein may be applied to asphalt road paving as a "binder." The term binder is defined more clearly in the compositions section below.

The term "asphalt" is defined by the American Society for Testing and Material (ASTM) as a dark brown to black cementitious material solid or semi solid in consistency, in which the predominating constituents are bitumens which occur in nature as such or are obtained in residue in refining petroleum. Asphalt is a constituent of most crude petroleum. More generally, the present compositions and methods described herein consider asphalt a colloidal system. Asphalt is composed of asphaltenes and maltenes. The relative amounts of asphaltenes and maltenes determine the physical and chemical behavior of any given asphalt.

The term "bitumen" refers to a generic term that according to ASTM relates to a mixture of hydrocarbons of natural or pyrogenous origin, or a combination of both, frequently accompanied by their non metallic derivates, which may be gaseous, liquid, semisolid, or solid and which are completely soluble in carbon disulphide. In commercial practice the term bitumen is used for the semisolid or solid bitumen which includes asphalts, tars and pitches. The latter two materials are obtained by destructive heat action on crude oil, coal and other organic materials.

The term "asphaltene(s)" refers to the portion of asphalt that is naphtha insoluble, so that in excess of naphtha the asphaltenes are insoluble. The asphaltenes may represent up to 50% of asphalt, in which a major portion of total Oxygen, Nitrogen, Sulfur, Nickel and Vanadium are concentrated. Asphaltenes are brown to black amorphous solids. Then have carbon/hydrogen ratios of 0.81-1.00 which indicates they are aromatic in nature. Their molecular weight ranges from 500-7000.

The term "maltene" refers to the naphtha soluble portion of asphalt. The maltene fraction is free of asphaltenes and carbenes. The maltene carbon/hydrogen ratio is in the range of 0.6-0.75 which indicates that the molecular structure includes aliphatic chains or saturated rings. The maltene fraction includes resins and oils. The molecular weights are in the range of 500-1500.

The term "resins" refers to cyclic aromatic compounds.

The term "oils" refers to saturated hydrocarbons having appreciable wax content.

The term "carbenes" refers to the highest carbon content fraction of asphalt. Carbenes are insoluble in carbon tetrachloride. Carbenes, if present, occur in trace amounts.

The term "asphalt feedstock" refers to an asphalt starting material. Typically, the chemical composition and physical properties The term "penetration" refers to the depth a standard steel needle with a truncated cone penetrates a properly prepared sample of asphalt. Penetration is related to hardness or consistency of the asphalt. The apparatus which permits the needle holder to move vertically without fraction and measures the depth of penetration to the nearest 0.1 mm is known as penetrometer. The distance that the needle penetrates in units of tenths of a millimeter is the penetration value. The weight of the needle is 50 g and another 50 g weight is placed on the needle, which results in a 100 g weight. The needle is slowly lowered onto a sample until it just makes contact with the surface of the sample. The dial of the penetrometer is adjusted to zero and the needle is released quickly for the specified period of five seconds and the distance penetrated is measured to the tenth of a millimeter.

The term "softening point" refers to a measure of temperature in which a steel ball passes through a ring that includes the asphalt sample and falls a distance of 2.54 cm, when the specimen, ball and bath of water/glycerin are heating at a specified rate. A steel ball, 9.54 mm in diameter, is placed in each ball centering guide.

The term "viscosity" refers to the viscosity determination of asphalt at elevated temperatures using a rotational viscometer as described in ASTM D4402, which is hereby incorporated by reference.

METHOD FOR DISSOLVING GROUND TIRE RUBBER

Referring to FIG. 1, there is shown an illustrative method 100 for dissolving ground tire rubber in asphalt. The method presented herein exposes the ground tire rubber to temperature exceeding 525° F. for periods of less than 5 hours causes the ground tire rubber to release process oils embedded within the ground tire rubber into the asphalt.

At block 102 an appropriate asphalt feedstock is selected. By way of example and not of limitation, the illustrative asphalt feedstock has a penetration of 135 dmm@77° F.

At block 104, the asphalt feedstock is heated to between 320° F. to 420° F.

At block 106, ground tire rubber was added to the heated asphalt and stirred.

By way of example and not of limitation, a preliminary mixing process is initiated in a "wetting tank" where the ground tire rubber is combined with asphalt. This preliminary mixing process effectively disperses the dry ground tire rubber so that a uniform mixture can be pumped at approximately 375° F. to 400° F. into a separate mixing vessel.

In a broad illustrative embodiment, 1% to 70% by weight of ground tire rubber is added to the heated asphalt. In a narrower illustrative embodiment, 5% to 50% by weight of ground tire rubber is added to the heated asphalt. In an even narrower illustrative embodiment, 7% to 30% by weight of ground tire rubber is added to the heated asphalt.

At decision diamond 108, a determination was made whether to add Nitrogen or other non-oxygenated gas to the mixing chamber. The illustrative application of Nitrogen to the mixing chamber ensures that there is little or no oxidation in the mixing chamber. Although the illustrative process can be performed in air, the use of a Nitrogen blanket or other non-oxygenated gas excludes air and oxygen from the reactor environment. However, there may be circumstances where some oxidation is necessary and thus some air or oxygen enters the reactor environment. In another illustrative embodiment, the mixing chamber has some air, but is surround by an inert atmosphere so there is minimal oxidation.

In operation, Nitrogen ($N_2$) is added to the top of the reactor, i.e. mixing vessel, to provide a low pressure sweep in the headspace of the mixing vessel to remove the air and prevent oxygen entrapment in the asphalt/GTR mixture during the reaction in block 110. Additionally, Nitrogen may also be introduced from the bottom of the reactor. In certain embodiments, Nitrogen may be introduced in the headspace and the bottom of the mixing vessel.

At block 110, the mixture of asphalt and ground tire rubber is heated to approximately 525° F.-700° F. in the illustrative mixing vessel, which is also interchangeably referred to as a "reactor" or "reaction vessel." In a narrower illustrative embodiment, the ground tire rubber and asphalt is heated to 575° F.-625° F. In an even narrower illustrative embodiment, the ground tire rubber and asphalt is heated to 590° F.-610° F.

The asphalt/GTR material is mixed for approximately 5 minutes to 360 minutes. In a narrower illustrative embodiment the asphalt/GTR material is mixed for approximately 5 minutes to 60 minutes. In one illustrative embodiment, the mixing vessel includes a circulating pump that uniformly mixes the asphalt/GTR during the heating process in the mixing vessel. In another illustrative embodiment, a stirrer is used within the mixing vessel.

The uniform mixing process avoids hot spots within the reaction vessel, i.e. mixing chamber. Additionally, the uniform mixing produces an even heating rate as the asphalt/GTR mixture is raised from approximately 400° F. (in the wetting tank) to approximately 600 in the mixing vessel.

At block 112, the asphalt/GTR mixture is quenched with the addition of asphalt, which cools the asphalt/GTR mixture from approximately 600° F. to approximately 500° F. or less. In another illustrative embodiment, water may be used to cool down the illustrative asphalt/GTR 500° F. or less.

The resulting mixture is referred to as "ground tire rubber asphalt" or "GTR asphalt." The result GTR asphalt mixture experiences a significant increase of penetration at 77° F. over the original bitumen while minimizing the oxidation and aging reactions associated with exposure of bitumen to high temperatures.

The inventors' hypothesize that the heated ground tire rubber releases process oils from the ground tire rubber into the maltene fraction of the asphalt, which improves both the oxidation resistance and ductility properties. Additionally, the inventor's hypothesize that the bitumen (asphalt) is actually rejuvenated by the increase of the maltene to asphaltene fraction as observed when processing bitumen with vulcanized rubber, i.e. the ground tire rubber asphalt.

The inventors' also hypothesize that the Sulfur-Carbon (S-C) bonds are easier to break than the Carbon-Carbon (C-C) bonds. In other words, the heating process described herein "devulcanizes" the rubber by removing the cross-linking caused by the S-C between the polymer chains having the C-C bonds. The result is the more soluble polymers, i.e. oils with C-C bonds, are dissolved in the mixing vessel.

This hypothesis is supported by the finding that the addition of dissolved rubber reduces the flash point. For example, an original asphalt flux COC flash point was 687° F. After incorporation of 20% GTR at 600° F. for 30 minutes, the COC flash point dropped to 608° F. This drop in flash point is caused by more soluble oils being released from the GTR. Recall that the process oils used to manufacture tires have flash points ranging from 400° F.-500° F., thus the flash point would be reduced when the oils are released from their fixated GTR state.

At block 114, the method proceeds to enhance the resulting asphalt/GTR mixture by adding of a wide range of polymers such as styrenic block copolymers, olefinic elastomers, olefinic vinyl acetates, natural rubber, and various agents required to emulsify the composition. The use of polymers treated with various oils, asphalt flux, or plasticizers prior to mixing with the GTR asphalt allows for the incorporation of high molecular weight polymers at relatively low quantities that enhance both the flexibility and elasticity of the GTR asphalt. Also, common emulsification agents and reagents can be used to adjust pH for the production of either cationic or anion emulsions.

Furthermore, the more recent use of saponification agents such as stearamides and phosphates in bitumen can be used with the resulting GTR asphalt to adjust the properties of softening point and penetration while yielding good viscosity control as needed. The GTR asphalt may also be combined with saturated fabrics such as fiberglass, polyester, rayon, nylon, or combinations thereof in various application such as paving, roofing, mining liners, and waterproofing. Further still that GTR asphalt may be used in drilling fluid applications to improving the viscosity curve of asphalt, thereby expanding the range of formulation options available to a drill fluid chemist.

Further still, the use of ground tire rubber and other vulcanized rubber containing carbon black enhance the black color of the GTR asphalt. This enhancement in addition to the improved weathering commonly associated with carbon black, allows the paving produced with GTR asphalt to yield a long lasting high contrast surface for traffic marking that greatly improving both day and night time visibility. Additionally, in roofing applications, the carbon black stabilizes the roof coating improving weathering resistance and provides a deep black uniform surface for enhanced appearance of various blended and single color granule applications.

MODIFIED METHOD FOR DISSOLVING TIRES

The illustrative method 100 for dissolving ground tire rubber may also be modified to receive vulcanized rubber from entire tires or partially cut tires. While most processes require that the vulcanized rubber such as tires be ground to remove the bias and steel ply adding substantial cost to the preparation of the material, the illustrative method 100 may be modified to support placement of the entire tire or partially cut tire into a bath of oil or asphalt, and then heating and stirring to provide uniform heat distribution.

In the modified method 100, oil may be used instead of asphalt feedstock at block 102. When oil is used, instead of asphalt the resulting product is a "dissolved rubber medium." However, asphalt may also be used at block 102 to product a "rubber asphalt medium." At block 112, after the vulcanized rubber, oil, carbon black are released from the tire ply into the liquid medium, the dissolved material is then drained from the heating vessel leaving the ply material behind. The ply material is then removed and washed with a suitable solvent to remove excess asphalt from the ply and belts. A magnet is used to remove the steel belts, which are then for recycled. The "dissolved rubber medium" or "rubber asphalt medium" may then be used in the wide range of applications containing asphalt.

The primary advantage to this modified method for dissolving tire rubber is the simplification of the pre-treatment required to process tires for recycling. The modified method eliminates the need for grinding to mesh size material using expensive cryogenic or hydrological systems. Since the steel belts and ply are very large size in the dissolved medium, they are easily recovered with simply straining and filter mechanisms for subsequent cleaning with suitable solvents for recycling.

SYSTEM FOR DISSOLVING RUBBER

Figure 2:
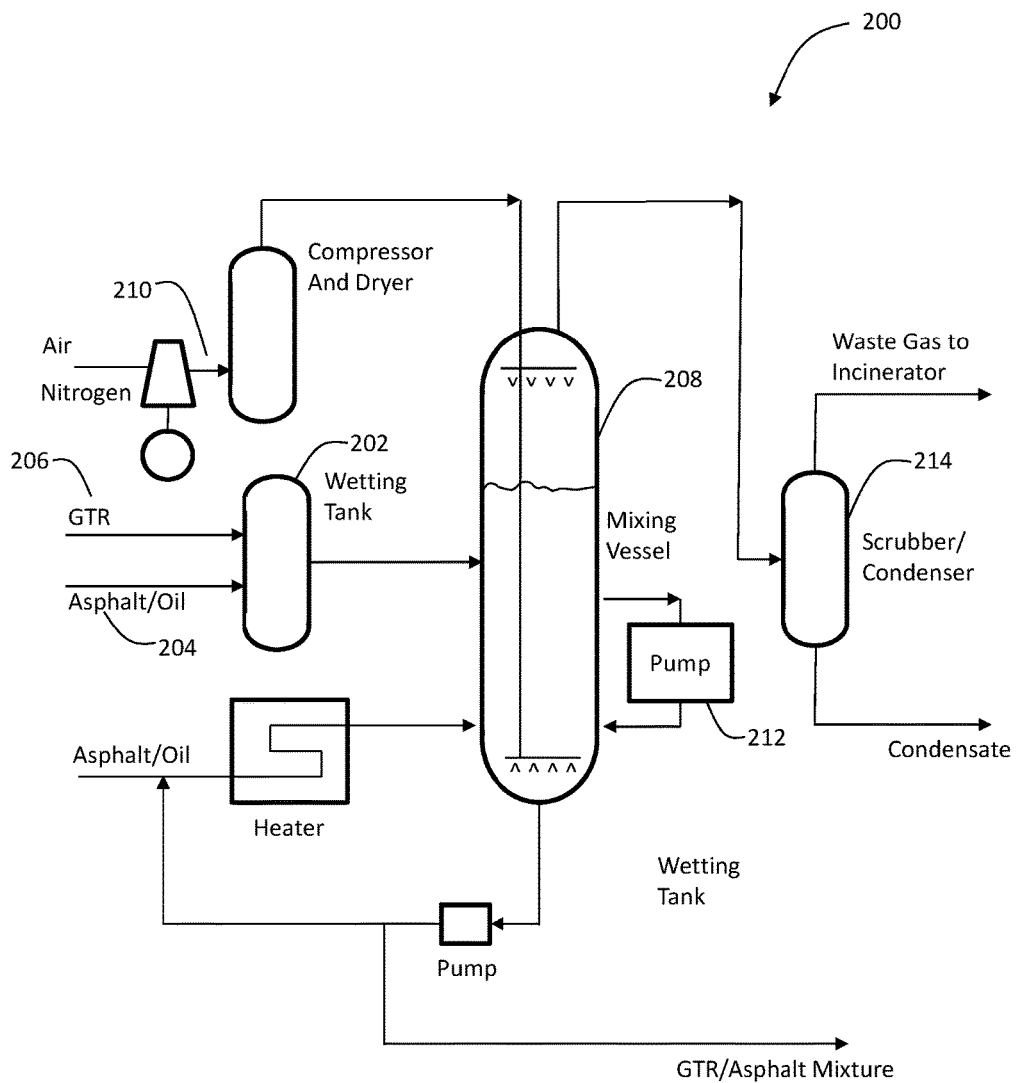
FIG. 2 shows an illustrative batch reaction process.

Referring to FIG. 2 there is shown a system 200 that controls a batch process that dissolves tire rubber in asphalt or oil. The illustrative system 200 includes a wetting tank 202 that receives an asphalt feedstock or oil at 204. Additionally, the ground tire rubber 206 is also received by the wetting tank 202, which performs preliminary mixing and heats the GTR 206 and the asphalt/oil to approximately 375° F.-400° F.

The preliminary mixture of GTR and heated asphalt or oil is then pumped to a reactor 208, which is filled to the desired operating level, e.g. 65%-75% of the column height.

The illustrative reactor 206 is a vertical vessel equipped with a gas distribution component, which has a feeder at the top and bottom of the reactor 206. The gas distribution component 210 may receive Nitrogen, air or any other such gas. In one illustrative embodiment, Nitrogen ($N_2$) is added to the top of the mixing vessel 208 to provide a low pressure sweep in the headspace of the mixing vessel to remove the air and prevent oxygen entrapment in the asphalt/GTR mixture during the reaction in block 110. Nitrogen may also be introduced from the bottom of the reactor or in the combination of the headspace and the bottom of the mixing vessel.

The mixture of asphalt and ground tire rubber is heated to approximately 525° F.-700° F. in the mixing vessel 208. In the illustrative embodiment, the mixing vessel includes a circulating pump 212 that uniformly mixes the asphalt/GTR during the heating process in the mixing vessel. The uniform mixing process avoids hot spots within the reaction vessel, i.e. mixing chamber.

The asphalt/GTR mixture is quenched with the addition of asphalt, which cools the asphalt/GTR mixture from approximately 600° F. to approximately 500° F. or less. In another illustrative embodiment, water may be used to cool down the illustrative asphalt/GTR 500° F. or less.

The resulting mixture is referred to as "ground tire rubber asphalt" or "GTR asphalt." The result GTR asphalt mixture experiences a significant increase of penetration at 77° F. over the original bitumen while minimizing the oxidation and aging reactions associated with exposure of bitumen to high temperatures.

Fumes produced in the process may be disposed of by with a scrubber/condenser 214.

EMBODIMENTS

In the illustrative embodiments presented herein, an asphalt feedstock is mixed with a natural or synthetic rubber items, and the mixture is heated to 600° F. with stirring for at least 10 minutes. The illustrative embodiments show a substantial increase in the penetration of the asphalt, which results in a homogeneous mixture that can be poured through a 100 mesh sieve. The ground tire rubber asphalt may be solubilized in D-Limonene with better than 99.0% passing No. 54 Whatman filter paper.

Example 1

In this illustrative embodiment, an asphalt feedstock having a penetration of 135 dmm@77° F. is heated to between 320° F. to 420° F. Approximately, 10% ground tire rubber was added to the heated asphalt and stirred at 4200 rpm. After approximately 15 minutes of mixing, the mixing speed is reduced to 4000 rpm and stirring continues for an additional 15 minutes. During the stirring process, the mixture of asphalt and ground tire rubber is heated to approximately 605° F. The asphalt/GTR mixture is then held at 600° F. to 605° F. for 15 minutes. After the asphalt/GTR mixture is heated to 605° F. for 15 minutes, the stirrer is turned off and the mixture cools to approximately 350° F.-360° F. and samples prepared for physical property testing. The resulting mixture is referred to as "ground tire rubber asphalt" or "GTR asphalt."

The solubility of the ground tire rubber asphalt was tested by dissolving 3 grams of GTR asphalt in a 125 ml of a solution composed of at least 90% D-Limonene CAS 5989-27-5. The solution was warmed gently on a hot plate with stirring for approximately 5 to 7 minutes—at which point the solid GTR asphalt sample is visibly dissolved in the D-Limonene. The solution was allowed to return to ambient temperature (about 15 minutes) and filter with vacuum using a No. 54 Whatman filter paper and Buchner funnel. It was found that 99.4% of the solution passed the filter leaving a gray-tan coloration on the filter paper.

TABLE 1

| Property | Before Heating | After Heating | % Change |
|---|---|---|---|
| V275F D4402 (cP) | 250 | 352 | 71 |
| V350F D4402 (cP) | 48 | 83 | 173 |
| Soft. Point D38 (F) | 112 | 111 | 0 |
| Pen 77 F. D5 (dmm) | 135 | 200 | 148 |
| G*/sin δ @ 58 C., (Pa S) | 0.958 | 0.960 | 0 |
| G*/sin δ @ 52 C., (Pa S) | 2.21 | 1.30 | −41 |
| *D-Limonene Solubility using D2042 (%) | NA | 99.4 | NA |

(*D-Limonene substituted for trichloroethylene for safety)

Table I presents the physical properties "before heating" the feedstock, which does not include the 10% ground tire rubber and "before heating" to approximately 600° F. The addition of ground tire rubber and heating to approximately 600° F. results in a significant increase in viscosity as reflected by rows V275F and V350F. The increase in viscosity indicates that the ground tire rubber has been fully incorporated into the mixture. Thus, the ground tire rubber is substantially more than a particle dispersion in the asphalt mixture.

Table 1 also reflects that there no significant change in softening point (Soft. Point) of the asphalt after the ground tire rubber is added and the treated to 600° F. However, a substantial increase in penetration (Pen) is observed after the ground tire rubber is digested at approximately 600° F. This increase in penetration is likely due to the release of compounding oils from the ground tire rubber into the asphalt, with little or no significant oxidation of the asphalt place because of the Nitrogen purge on the reactor.

The G*/sinδ@58° C. (Pa S) is a rheological measure of road binder stiffness before any type of age conditioning. In this illustrative example, the oil released from the ground tire rubber has minimal impact on the road binder stiffness.

The G*/sinδ@52° C., (Pa S) is a rheological measure representing the measure of road binder stiffness by aging in a Rolling Thin Film Oven (RTFO) for 86 minutes at 140° C., which simulates aging in a paving hot mix plant. Typically, an unaged binder has a value of "1" before RTFO aging, and this value increases to approximately "2.2" following RTFO aging.

Interestingly, after heating the GTR/asphalt mixture and Nitrogen purging, the RTFO aging value is "1.3." The inventors' postulate that the oils from the ground tire rubber that are extracted during the heating of the GTR/asphalt mixture reduce the effects of aging. This unexpected result substantially improves the aging of the GTR/asphalt.

To validate that the ground tire rubber has been solubilized into the asphalt the D-Limonene Solubility test as described in ASTM D2042 is utilized. The solubility test indicates that after a cold solvent wash less than 0.6% residue remains, thus showing that ground tire rubber has been substantially solubilized.

Example 2

In this illustrative embodiment, an 80 mesh ground tire rubber at 20% is mixed with an asphaltene having a penetration of less than 23 dmm. More specifically, the asphaltene having a penetration of less than 23 dmm@77° F. is heated to between 320° F. to 420° F. Approximately 20% ground tire rubber was added to the heated asphalt and stirred at 4200 rpm. After approximately 15 minutes of mixing, the mixing speed is reduced to 4000 rpm and stirring continues for an additional 15 minutes. During the stirring process, the mixture of asphalt and ground tire rubber is heated to approximately 605° F. The asphalt/GTR mixture is then held at 600° F. to 605° F. for 15 minutes. After the asphalt/GTR mixture is heated to 605° F. for 15 minutes, the stirrer is turned off and the mixture cools to approximately 350° F.-360° F. and samples prepared for physical property testing. A significant increase in penetration at 77° F. is observed in Table II results.

TABLE II

| Property | Before Heating | After Heating | % Change |
|---|---|---|---|
| V275F D4402 (cP) | 1174 | 1160 | 1 |
| V350F D4402 (cP) | NA | NA | NA |
| Soft. Point D38 (F) | 144 | 127 | −12 |
| Pen 77 F. D5 (dmm) | 22 | 77 | 250 |
| G*/sin δ @ 58 C., (Pa S) | NA | NA | NA |
| G*/sin δ @ 52 C., (Pa S) | NA | NA | NA |
| *D-Limonene Solubility using D2042 (%) | NA | 99.2 | NA |

Example 3

In a third illustrative embodiment, an asphaltene feedstock have a penetration of less than 23 dmm was mixing with 20% ground tire rubber having a 30 mesh size. The same method as described in Examples 1 and 2 was applied in Example 3. The results show a significant increase in penetration at 77° F. as observed in the initial experiment confirming the validity of the result with a larger ground tire rubber particle size.

TABLE III

| Property | Before Heating | After Heating | % Change |
|---|---|---|---|
| V275F D4402 (cP) | 1174 | 1347 | 15 |
| V350F D4402 (cP) | NA | NA | NA |
| Soft. Point D38 (F) | 144 | 139 | −3 |
| Pen 77 F. D5 (dmm) | 22 | 65 | 195 |
| G*/sin δ @ 58 C., (Pa S) | NA | NA | NA |
| G*/sin δ @ 52 C., (Pa S) | NA | NA | NA |
| *D-Limonene Solubility using D2042 (%) | NA | 99 | NA |

BINDERS

Asphalt binders cannot be represented by a single chemical formula. The American Society of Testing and Materials (ASTM) defines it as "a dark brown to black cementitious material in which the predominating constituents are bitumens which occur in nature or are obtained in petroleum processing." Asphalt binders are, however, fractionated into two subdivisions, i.e., asphaltenes and maltenes. Asphaltenes (A) are defined as that fraction of the asphalt insoluble in n-pentane. The function of the asphaltenes is to serve as a bodying agent. Maltenes is the collective name for the remainder of the asphalt material left after precipitation of the asphaltenes.

Four principle bodies of maltenes have been identified and each has a specific function. These four bodies are polar compounds, first acidiffins, second acidiffins and saturated hydrocarbons or paraffins. Polar compounds or Nitrogen bases (N) include components of highly reactive resins, which act as a peptizer for the asphaltenes. First acidiffins (A1) are components of resinous hydrocarbons which function as a solvent for the peptized asphaltenes. Second acidiffins (A2) include components of slightly unsaturated hydrocarbons that also serve as a solvent for the peptized asphaltenes. Saturated hydrocarbons or paraffins (P) are components of hydrocarbons, which function as a jelling agent for the asphalt components.

The cementing agent in an asphalt pavement, the asphalt binder (normally 4%-7% by weight) represents the component that experiences premature hardening as a result of oxidation.

Asphalt pavements, which are structurally sound, deteriorate as a result of oxidation and occasionally as a result or incorrect design or improper construction practice. Generally, the "A" and "P" asphalt components are the most stable; and the "N", "A1", and "A2" components are more subject to oxidation in descending order, respectively.

Consequently, during oxidation the "N" components convert to "A" components rapidly while the conversion process for the "A1" and "A2" components proceed at a slower rate. This process results in an increase (over time) of the "A" fraction of asphalt and a decrease (over time) in the "N", "A1", and "A2" components.

The maltenes parameter (N+A1)/(P+A2), which is the ratio of chemically more active to less reactive components present in the asphalt binder, is a measure of predictable durability. Thus, during the process of weathering or oxidation, the ratio of maltenes to asphaltenes is reduced with the result being a dry and brittle pavement.

Therefore, if a rejuvenator is to successfully resurrect an aged facility, it must be able to penetrate the pavement and to a limited depth improve or restore the maltenes to asphaltenes balance. A reasonable measure of the ability of a rejuvenator to improve a pavement's durability can be had by comparing the penetration at 77° F. of the asphalt binder extracted from untreated and treated sampled, and the viscosity at 140° F. of the asphalt binder extracted from untreated and treated samples.

In summary, the criteria for a rejuvenator must contain maltenes fractions of asphalt in order to improve and balance the maltenes to asphaltenes ratio and a test method must be employed to measure improved durability of a pavement such as an an asphalt penetration or a viscosity test.

COMPOSITIONS

Additional compositions of matter can be formulated with the dissolved ground tire rubber asphalt or ground tire rubber oil, which is also referred to as "solubilized rubber compound."

The solubilized rubber compound presented herein utilizes a significantly shorter process time and operates a much higher temperature than other processes. For example, the solubilized rubber compound is heated for less than 60 minutes at 600° F., which solubilizes the ground tire rubber and releases oil and carbon black (from the ground tire rubber) with minimal degradation of the asphalt (or oil) using a Nitrogen blanket or some other oxygen minimizing technology.

The solubilized rubber compound described above may be used to make solvent based cut backs, primers, hot and emulsion based highway tack coats and membranes, non-ionic emulsions, mastics, roof coatings solvent and emulsion based, waterproofing primers, and concrete and asphalt drive way sealers, joint calking or filling compounds, rubber compounding oil, roofing with chopped fiber or partially saturated reinforcements or sub layers.

Additionally, the solubilized rubber compound may also be used with adhesives and sealants for roofing shingles and self-applied roofing and waterproofing membranes.

Furthermore, the solubilized rubber compound may be used in applications utilizing asphalt in automotive undercoating, pipe wrap, in addition to wire and cable wrap benefit from the carbon black released from the rubber compound along with the oils that improve both weathering and adhesion of these materials to a wide variety of substrates.

Further still, chemical treatment of the solubilized rubber compound can also be performed using various acids and catalyst common to the roofing and paving industries.

In paving it is common to add super polyphosphoric acid to improve flow properties of the asphalt and likewise enhances the solubilized rubber compound.

Oxidized asphalt is routinely prepared using a range of acids and additives to catalyze the oxidation process by reducing the air blowing time and improve the ratio of the desired properties of penetration, softening point, and viscosity. This solubilized rubber compound can be used to air blow with or without catalyst to make a roof coating that yields improved weathering from the carbon black and oils released from the vulcanized rubber compound.

Likewise, post blending of the solubilized rubber compound into oxidized roofing coating to improve penetration and viscosity yields improve coating weathering performance.

There solubilized rubber compounds presented above may employed for asphalt pavement preservation, including rejuvenator emulsions, asphalt emulsion fog seals, a variety of surface treatments (including slurry and micro surfacing technologies), and emerging asphalt thin overlay technologies.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

The invention claimed is:

1. A method for generating a dissolved rubber compound comprising:
   receiving an asphalt compound;
   heating the asphalt compound to a first temperature between 320° F. and 420° F.;
   adding a tire rubber compound to the asphalt compound;
   mixing the asphalt compound and the tire rubber compound for approximately 5 minutes to 240 minutes;
   generating the dissolved rubber compound by heating a mixture of the asphalt compound and the tire rubber to a second temperature between 575° F. and 700° F., wherein there is little or no oxidation of the asphalt compound and the dissolved rubber compound; and
   cooling the dissolved rubber compound.

2. The method of claim 1 wherein the mixture is heated with minimal oxidation.

3. The method of claim 2 further comprising applying a non-oxidizing gas to the heated mixture.

4. The method of claim 2 further comprising applying a $N_2$ gas to the heated mixture.

5. The method of claim 1 wherein the mixture of the asphalt compound and the tire rubber is heated to approximately 575° F.-625° F.

6. The method of claim 1 wherein the mixture of the asphalt compound and the tire rubber is heated to a second temperature between 590° F.-610° F.

7. The method of claim 1 wherein the mixture of the asphalt compound and the tire rubber is heated for approximately 5 minutes to 60 minutes.

8. A method for generating a dissolved rubber compound comprising:
   receiving an oil compound;
   heating the oil compound to a first temperature between 320° F. to 420° F.;
   adding a tire rubber compound to the oil compound;
   mixing the oil compound and the tire rubber compound for approximately 5 minutes to 240 minutes;
   generating the dissolved rubber compound by heating a mixture of the oil compound and the tire rubber to a second temperature between 575° F.-700° F., wherein there is little or no oxidation of the asphalt compound and the dissolved rubber compound; and
   cooling the dissolved rubber compound.

9. The method of claim 8 wherein the mixture is heated with minimal oxidation.

10. The method of claim 9 further comprising applying a non-oxidizing gas to the heated mixture.

11. The method of claim 9 further comprising applying a $N_2$ gas to the heated mixture.

12. The method of claim 8 wherein the mixture of the oil compound and the tire rubber is heated to a second temperature between 575° F.-625° F.

13. The method of claim 8 wherein the mixture of the oil compound and the tire rubber is heated to a second temperature between 590° F.-610° F.

14. The method of claim 8 wherein the mixture of the oil compound and the tire rubber is heated for approximately 5 minutes to 60 minutes.

15. The method of claim 1 wherein the dissolved rubber compound has a penetration at 77° F. that is 150% to 250% greater than the asphalt compound.

16. The method of claim 8 wherein the dissolved rubber compound has a penetration at 77° F. that is 150% to 250% greater than the asphalt compound.

* * * * *